United States Patent Office 2,978,309
Patented Apr. 4, 1961

2,978,309

TREATMENT OF IRON CHLOROSIS IN CHLOROPHYLLACEOUS PLANTS

Saul R. Buc, Easton, Pa., assignor to General Aniline & Film Corporation, New York, N.Y., a corporation of Delaware No Drawing. Filed Oct. 26, 1956, Ser. No. 618,460

6 Claims. (Cl. 71—1)

This invention relates to the treatment of iron chlorosis in chlorophyllaceous plants by the application of ferrocyanide or ferricyanide salts to loci to be treated.

It is known that iron is essential to normal plant development and is directly connected with the formation of chlorophyll. In the leaves of healthy plants iron will average a few hundredths of one percent, the amount never varying greatly. Iron deficiency is shown by chlorosis, a pale-yellow or whittish color in plant leaves, which uncorrected leads to the death of the plant. In milder cases, where visually detectable symptoms do not occur, yields of crops may be impaired.

Although there is an abundance of iron in nearly all soils, the exchangeable iron is calcareous and other soils around the neutral point may be so low that the plants are unable to absorb enough for healthy growth. Besides the iron of the undecomposed silicate minerals in the soil, there are two other general forms, the iron of the colloidal clay or absorption complex, and iron in the form of oxide, both hydrated and anhydrous. The iron in the colloidal clay behaves much the same as aluminum.

The solubility of iron in the soil is governed by the reaction of the soil, the element being comparatively soluble in very acid soils, and also by the prevalence of oxidizing and reducing conditions. Iron in the form of hydrated iron oxide, particularly, is easily reduced under some soil conditions and remains in solution as ferrous bicarbonate. The submerged soil conditions that occur during very wet weather are favorable for the solution and transportation of iron in the soil solution, and in extreme cases the concentration of iron may exceed the toxic limit.

Iron deficiency diseases are found on plants grown in both acidic and alkaline soils. Large excesses of soluble iron in a strongly acid soil may be toxic to plants. On the alkaline end of the reaction scale, i.e., at high pH values, soluble compounds of iron are not compatible with soluble phosphates since they form insoluble compounds that are largely unavailable to plants. For this reason the disease, iron chlorosis, is particularly severe on alkaline soils, of which considerable number of acres throughout the west and middle west are used for agricultural purposes.

It has been reported that on some acid soils (pH values less than 6.5) the disease is economically curtailed by the application of various iron compounds which yield cationic iron on ionization in soil solution. Such compounds include, ferrous and ferric sulfates, citro-iron sulfate (citric acid and ferrous sulfate mixture), ferric phosphate, iron and potassium tartrate, ferric citrate, ferric nitrate, ferrous ammonium sulfate, etc. Iron chelates of ethylene diamine tetraacetic acid, hydroxyethyl ethylene diamine triacetic acid, bis (hydroxyethyl) ethylene diamine diacetic acid, diethylene triamine pentacetic acid, cyclohexylene diamine tetraacetic acid, and the like, on some acid soils offer a complete and economically practical solution to the iron chlorosis problem. The iron chelate, EDTA, is not stable at high pH's and loses its iron slowly as ferric hydroxide. Other iron chelates, some closely related to ethylene diamine tetraacetic acid and others less closely related, have been designed which cure the disease experimentally on alkaline soils. These, however, are more expensive and to date have not gained economic usefulness or acceptance.

It has also been reported by Rediske and Biddulph, Plant Physiology, 28, 576–93 (1953), that the amount of iron obtainable from the growing media or plant loci (plant surroundings capable of acting as a source of plant nutrients) adsorbed and absorbed by the roots and transported to leaves is dependent on the pH,, the phosphorous concentration, and the chemical form of the iron. Either high pH or high phosphorous concentration reduce the availability of iron via the roots of the plants and the combination of high pH and high phosphorous concentration induces iron deficiency chlorosis. Ferrocyanides and ferricyanides in acidic media of low phosphate content, are absorbed to a markedly lesser extent than ferrous sulfate, ferric oxalate, ferric humate and the like, and even to a lesser extent than ferric phosphate, a relatively poor source of available iron; at pH 4, hexacyanoferrates are no more effective than controls (without added iron) on absorption and translocation from root to leaf.

To provide a treatment of iron chlorosis in chlorophyllaceous plants grown in calcareous soils constitutes the principal object of the invention.

Other objects and advantages will become manifest from the following description.

I have found that all chlorophyllaceous plants grown in calcareous soils and displaying iron deficiency symptoms can be readily treated to cure the disease by the application to the locus of a water soluble salt of ferrocyanic or ferricyanic acid. This is surprising and unexpected. Inasmuch as the aforementioned authors tested a ferrocyanide and a ferricyanide water soluble salt only at pH 4.0, no chlorosis would be observable in the presence or absence of added iron since the cotyledons supply iron to the leaves resulting in a normal green plant. Accordingly, their tests are meaningless as regards information regarding ferrocyanides as a source of available iron for combating chlorosis at a pH of 7 and above i.e. in chlorophyllaceous plants. The water soluble salts which I found to be particularly effective are complex coordination compounds and therefore might be better named hexacyanoferrates (11) $H_4[Fe(CN)_6]$ and hexacyanoferrates (111) $H_3[Fe(CN)_6]$ respectively. By calcareous soils, as employed herein, is meant soils that contain free lime (calcium carbonate) in their subsoils. Strictly speaking, the pH of a calcareous soil depends on the carbon dioxide content of the soil solution, but for most soils containing lime it varies between 7.5 and 8.5. In other words, the soils of this group have moderately alkaline subsoils, whereas the surface soils are usually neutral in reaction. By application to the locus is meant mixing the salt alone, or with a fertilizer, with the soil, broadcasting on soil, spraying aqueous solutions thereof on soil and plants, injection of aqueous solutions into plants, dispersions in suitable media sprayed on soils, etc.

The water soluble salts may be applied in aqueous solution to either soil or plant, or the salt itself is broadcast or sprayed on soils.

As examples of such salts the following are illustrative:

Ammonium ferrocyanide
Calcium ferrocyanide
Sodium ferrocyanide
Potassium ferrocyanide
Ammonium ferricyanide
Potassium ferricyanide
Sodium ferricyanide
Potassium sodium ferricyanide
Calcium ferricyanide In addition to the foregoing illustrations, the following mixed salts, which are water soluble, may also be employed:

Ammonium calcium ferrocyanide
Ammonium potassium ferrocyanide
$(NH_4)_2MgFe(CN)_6 \cdot x\ H_2O$
$K(NH_4)_3Fe(CN)_6 \cdot 2NH_4Cl$ All of the foregoing salts of ferrocyanic and ferricyanic acid may be applied to the soil at the rate of 0.1 to 100 lbs. of iron per acre, particularly 5 to 30 lbs. of iron per acre. Dependent upon the iron content of the salt chosen, this is equivalent to the application of 5 to 800 lbs. of iron salt per acre, particularly 25 to 250 lbs. of iron salt per acre. Ornamental shrubs such as azaleas, rhododendrons, andromedas, and the like, may require an application of 4 lbs. of the iron salt per 100 gals. of water as a thorough cover spray. Soil application may range from 7.5 to 30 lbs. of the salt per acre. Similarly beans, cabbage, corn, etc. may require a soil application of 10 to 20 lbs. of the salt per acre. Spinach, on the other hand, for foliage application may require ½ lb. to 50 gals. of water per acre. Fruit trees such as pears, peaches, and cherries may require a soil application of 6 oz. per acre. Foliage application may require 1 to 3 lbs. per 100 gals. of water as a thorough cover spray. Tree trunk injection may require 2-6 oz. per tree.

The water soluble salts of ferrocyanic and ferricyanic acid, mixed salts or mixtures thereof may be applied to the growing media at the rate of 0.1 to 100 lbs. of iron per acre (0.5 to 700 lbs. iron salt per acre) and particularly in the range of 2 to 40 lbs. Fe/acre (12 to 280 lbs. iron salt per acre). The exact amount to be applied to a particular soil is dependent on the specific "available iron" salt selected, the type of plant, the extent of the iron deficiency, the nature of the soil, particularly the pH and the "available iron" deficiency of the soil. The amount of iron required therefore must be estimated, since it is dependent on the condition of the plants and the soil and should be in substantial excess to the actual use requirement of the plant in view of the general lack of complete accessibility of the plant to nutrients in the surrounding soil. Larger amounts of iron are required in general with larger plants and trees as well as with increasing denseness of the plant growth of an area.

The requisite amounts of several of the various "available iron" salts for application of 1.0 lb. Fe/acre of soil, are shown below:

| Salt | Form | lbs. salt/acre equal to 1.0 lb. Fe/Acre |
| --- | --- | --- |
| Ammonium ferrocyanide | $(NH_4)_4Fe(CN)_6 \cdot 3H_2O$ | 6.1 |
| Calcium ferrocyanide | $Ca_2Fe(CN)_6 \cdot \frac{1}{2}H_2O$ | 5.4 |
| Potassium ferrocyanide | $K_4Fe(CN)_6 \cdot 3H_2O$ | 7.6 |
| Sodium ferrocyanide | $Na_4Fe(CN)_6 \cdot 10H_2O$ | 8.7 |
| Magnesium ferrocyanide | $Mg_2Fe(CN)_6 \cdot 12H_2O$ | 8.5 |
| Ammonium ferricyanide | $(NH_4)_3Fe(CN)_6$ | 4.8 |
| Potassium ferricyanide | $K_3Fe(CN)_6$ | 5.9 |
| Dipotassium sodium ferricyanide | $K_2Na(CN)_6$ | 5.6 |
| Sodium ferricyanide | $NaFe(CN)_6 \cdot H_2O$ | 5.4 |

The above values are useful in that they may be used as conversion factors for determining the amount of a selected salt which is to be blended with fertilizer for application to a field i.e., lbs. of salt required=desired dosage (lb. Fe/acre) × salt-to-iron conversion factor × area (in acres) so that the amount of salt required for application of potassium ferrocyanide to a 10 acre field at the rate of 15 lb. Fe/acre would require 15 × 7.6 × 10 or 1140 lbs. of potassium ferrocyanide per acre. In practice, assuming fertilizer was to be simultaneously applied to the 10 acre plot at a rate of 800 lbs./acre, the fertilizer (8000 lbs.) and potassium ferrocyanide (1140) would be blended (total 9140 lbs.) and the blend applied to the 10 acre field at the rate of 914 lbs./acre.

The amount of ferro- or ferricyanide which is effective in combating chlorosis and in enhancing yield is dependent apparently on the available iron in the soil, and in the individual plant, the deficiency varying markedly in adjacent patches of ground in field and in adjacent plants. The use of as little as 0.5 lb./acre to chlorotic plants of salts of ferrocyanide or ferricyanide in conjunction with N-P-K containing fertilizer has been found to alleviate the chlorotic condition. When one uses as high as 750 lbs. per acre of salts of ferrocyanide or ferricyanide in treatment of chlorosis in certain plants, toxic effects begin to appear so that the practical maximum use appears to be about 650 pounds of the ferrocyanide or ferricyanide. In view of the differing toxicities of the various salts and the differing tolerances of various plants, it is likely that certain of the salts can be used in even higher concentrations with abundantly fertilized hardy plants.

The amount of ferro- or ferricyanide involved in combating chlorosis is very small in comparison with the amount of plant growing media treated, e.g., a 5 to 40 lb. Fe/acre treatment of the cultivable portion (the top ⅔ inch layer of soil) on one acre of soil (i.e., 43,560 sq. ft., which has been estimated by experts to weigh two million pounds) would yield an "available iron" concentration in the soil of only about 0.000025% to 0.0002% iron from ferrocyanides or ferricyanides. While the actual iron content of a soil growing chlorotic plants is often much larger, i.e., even plant available iron deficient soils reddened by presence of iron oxides, it is surprising that trace quantities of "plant available iron" from ferrocyanides or ferricyanides can successfully eliminate or at least markedly decrease chlorosis.

The water soluble salts of ferro- and ferricyanic acid utilized in accordance with the present invention may be mixed with various types of fertilizers such as organic fertilizers, sewage sludge, process sewage, urea, soybean meal, guano, dried blood, humus, animal manures, compost, bone meal, sawdust, peat moss, animal tankage, and other plant and animal waste products or they may be inorganic or mineral fertilizers including slaked lime, ground limestone, ammonium salts, potassium salts, nitrates, phosphates and other compounds containing nitrogen, phosphorus, potassium, calcium, magnesium as well as the essential trace elements, or mixtures of organic and mineral fertilizers.

The preferred practice of this invention involves the use of mineral fertilizers of high nitrogen, phosphorus and potassium content and which may have minor amounts of other elements required for plant growth. Such fertilizers are mostly comprised of nutrient minerals and may have from 15 to 50% of their weight as elemental nitrogen (N), phosphoric anhydride ($P_2O_5$), and potassium oxide ($K_2O$). It is conventional to describe mineral fertilizers in terms of the approximate percentage of each of the three most essential nutrients (N-P-K) by a series of three numbers representing the approximate concentration of elemental N, $P_2O_5$ and $K_2O$, respectively.

Since the usual organic fertilizers have only small nutrient content and primarily serve to improve soil structure, their function can be replaced, if desired, through the use of an inorganic fertilizer component plus a soil conditioning agent such as for example, the types described in U.S. 2,625,529.

The grade of fertilizer used is dependent on the soil, the crop and the economics involved. Common commercial grades of dry or liquid 10-10-10 (meaning 10% N-10% $P_2O_5$-10% $K_2O$), 5-10-5 and 5-10-10 and 6-10-4 (Vigoro) were found to be convenient and effective, i.e., any of the various commercial offerings could be used in the customary equivalent quantities found in fertilizer conversion tables. In general, the components of the fertilizers useful in this invention were present in the range of 0 to 10 parts by weight N, 4 to 30 parts by weight $P_2O_5$ and 4 to 30 parts by weight $K_2O$. While some soils, particularly those used in producing legumes, contained adequate nitrogen, so that this component was not necessarily present in the fertilizer, it is preferable that a balanced N–P–K fertilizer be used for the purposes of this invention.

The application of fertilizer to farm land varies from a minimum of 100 lbs./acre (lesser amounts in general being economically impractical from the standpoint of the grower) to a practical maximum of 2500 lbs./acre for the citrus and truck grower (high density planting) with intermediate values for grasses and legumes (300–500 lbs./acre) for corn (maximum of 1000 lbs./acre) and potatoes (maximum of 2000 lbs./acre) and in general varies with the crop, the soil and the economics of enhanced yield by application of fertilizer. Ornamental plots are often very highly fertilized. The greater amounts can effectively and economically be used in the germination of seeds and the growth of seedlings.

Use of liquid commercial fertilizers and mineral hydroponic solutions vary widely, but also fall within the general ranges indicated above.

For ease of application, the fertilizer, the hexacyanoferrate, or mixtures thereof are preferably in finely divided flowable form that is, as pulverized solids thereby permitting uniform mixing and spreading of the components or mixtures in the soil. The fertilizer, the hexacyanoferrate or mixtures thereof may be mixed with water and the resultant solutions and/or finely divided suspensions likewise used as a convenient flowable form for treatment of chlorosis. Preferably the hexacyanoferrate and the fertilizer are both present in the flowable composition useful for the treatment of the growing media.

The plant nutrient chlorosis inhibiting compositions of this invention include particularly the available iron and fertilizer formulations falling within the range of from 0.5 to 65 parts by weight of ferrocyanide and/or ferricyanide salt and from 200 to 2500 parts by weight of total fertilizer components. The composition and the substantially simultaneously used constituents combat chlorosis and enhance yields of chlorosis-susceptible chlorophyllaceous plants grown in various media (e.g., soil, sand, aqueous solutions of plant nutrients) by various methods (e.g., farming, greenhouse, hydroponic). For example, a mixture of from 0.5 to 65 lbs. of ferrocyanide and/or ferricyanide and from 200 to 2500 lbs. of commercial fertilizer will effectively alleviate the chlorosis of plants on one acre of land. For farming, the composition is of particular merit due to the economics in labor, time and equipment and to the efficiency of uniform spread, by employing a mixture rather than applying the components substantially simultaneously.

It is to be understood that the foregoing amounts are merely illustrative and do not apply as a positive rule or guide. The exact amount to be applied either to the soil or to the foliage of the plant or injection to stems or trunks of trees will depend upon the severity of the chlorosis and the nature or species of the plant. Hence, the exact amounts are readily determined by the treatment of a single plant, shrub, or tree, i.e., by conducting a simple spot experiment.

The following examples are illustrative of how the present invention may be practiced.

*Example I*

650 grams of Parkwood fine sandy calcareous loam having a pH of 7.8 was air dried, placed in a 5 inch clay pot and fertilized with 0.81 gram of ammonium nitrate, 0.45 gram potassium chloride, 0.50 gram of calcium phosphate and 0.284 gram manganese sulfate applied in solution and thoroughly mixed. A solution of potassium ferrocyanide containing 7.0 mg. of iron was added and thoroughly mixed. Three soybean seeds were planted in a pot. When the first trifoliate leaves appeared, these were thinned to one plant per pot. Other pots were prepared simultaneously which were given (1) no treatment, (2) treatment with 7.0 mg. iron as ferrous sulfate, (3) treatment with 7.0 mg. of iron chelated with hydroxyethyl ethylene diamine triacetic acid.

Each experiment was run in quadruplicate. After thirty days the untreated plants and those treated with ferrous sulfate were completely chlorotic. Those treated with the iron chelate of hydroxyethyl ethylene diamine triacetic acid were distinctly chlorotic. Those treated with potassium ferrocyanide showed no chlorosis whatever.

*Example II*

Example I was repeated with various salts in order to establish levels curative for chlorosis. The results obtained are shown in the following table.

| Agent | Percent Chlorosis Dosage levels (lbs. Fe/acre) | | | |
|---|---|---|---|---|
| | 2 | 5 | 10 | 20 |
| Potassium ferrocyanide | 56 | 35 | 24 | 0 |
| Potassium ferricyanide | 60 | 49 | 38 | 8 |
| Sodium ferrocyanide | 66 | 39 | 30 | 5 |
| Ammonium ferrocyanide | 77 | 91 | 45 | 0 |
| Ammonium ferricyanide | 100 | 73 | 73 | 32 |
| Control—100% Chlorotic. | | | | |

*Example III*

Soybean plants were grown in a calcareous soil to a height of 6 inches using the technique of Example I. Potassium ferricyanide and sodium ferrocyanide were then applied to the soil in large dosages. Toxicity appeared as leaf damage, the extent of which was estimated, and the following results obtained.

| Potassium Ferricyanide | | Sodium Ferrocyanide | |
|---|---|---|---|
| lbs. Fe/acre | Percent damage | lbs. Fe/acre | Percent damage |
| 10 | 0 | 8 | 0 |
| 22 | 0 | 17 | 0 |
| 45 | 0 | 35 | 0 |
| 90 | 0 | 70 | 25–50 |
| 180 | 25–50 | 140 | 100 |
| 360 | 100 | 280 | 100 |

From the foregoing results, it is readily noted that both salts are nontoxic at levels well above the levels necessary to control chlorosis. It seems probable that the toxicity of the sodium ferrocyanide is due to the sodium ion.

*Example IV*

The soil in which four chlorotic orange seedlings of 15–18 inches high were growing in a calcareous soil was treated with 5–10–5 fertilizer at the dosage level of 500 lb./acre and with potassium ferricyanide in amounts equivalent to the following dosage levels: 0, 3.2, 6.4 equivalent to the following dosage levels: 0, 3.2, 6.4 and 12.8 lbs. Fe/acre.

The results were judged by alleviation of chlorosis in the new growth. The controls showed no noticeable change in the severity of chlorosis, while 3.2 lbs. showed noticeable effect, 6.4 lbs. good effect and 12.8 lbs. complete control of chlorosis.

*Example V*

Four trees were selected at random from a groove of mature seriously chlorotic orange trees, containing about 100 trees per acre (soil pH=7.6) were treated separately with varying amounts as shown in the following table of potassium ferrocyanide, potassium ferricyanide, sodium ferrocyanide, sodium ferricyanide, ammonium ferrocyanide, ammonium ferricyanide, calcium ferricyanide and calcium ferrocyanide evenly blended with commercial 5–10–5 fertilizer.

The amounts used to treat each tree was the amount calculated to be equivalent to the lb. Fe per acre of iron salt (expressed as lbs. Fe/acre) and fertilizer e.g., each of one group of four trees was treated with 40 grams of iron per tree (75.6 grams of potassium ferrocyanide trihydrate) and 8 lbs. of 5–10–5 fertilizer. In conducting the experiments, eight pound portions of fertilizer were mixed with the necessary amount of the ferrocyanide or ferricyanide and the mixtures were broadcast on the soil around and under each tree.

After three months, the trees were inspected and observations concerning the chlorotic condition of each group of four trees recorded as indicated in the table. The leaves of the trees treated at the rate of 10 to 30 lbs. Fe/acre were much improved, some largely and most totally cured of chlorosis. A group of trees used as the control, which had been fertilized with an 8 lb. portion of fertilizer without added ferrocyanide or ferricyanide, were still seriously chlorotic. The experiments are summarized in the following table.

| Salt of Iron Cyanide | | | Amount of 5–10–5 Fertilizer (lb./acre) | Chlorosis Observations |
|---|---|---|---|---|
| Positive Ion | Fe Valence [1] | Amount: lb. Fe/acre | | |
|  |  | 0 | 800 | Severe. |
| K | 2 | 3 | 800 | Marked. |
| K | 2 | 7.5 | 800 | Little or none. |
| K | 2 | 10 | 800 | None. |
| K | 2 | 15 | 800 | None. |
| K | 3 | 15 | 800 | Slight. |
| K | 3 | 20 | 800 | None. |
| Na | 3 | 10 | 800 | Slight. |
| Na | 3 | 25 | 800 | None. |
| NH4 | 2 | 10 | 800 | Slight. |
| NH4 | 3 | 10 | 800 | Partial. |
| NH4 | 2 | 20 | 800 | None. |
| NH4 | 3 | 20 | 800 | Slight. |
| NH4 | 3 | 30 | 800 | None. |
| Na | 2 | 10 | 800 | None. |
| Ca | 2 | 20 | 800 | None. |
| Ca | 3 | 30 | 800 | None. |

[1] Fe valence: 2=ferrocyanide (FE++); 3=ferricyanide (Fe+++).

*Example VI*

A level approximately one hundred foot square plowed and harrowed plot was selected in a limestone base soil area which had in the past produced chlorotic soybeans plants.

The plot was marked into fifty two-foot strips. Twenty-two of the alternate strips were treated with a mixture of 10–10–10 fertilizer and the salt of ferrocyanic or ferricyanic acid at the rate of application shown in the following table. Three strips spaced in various parts of the area were selected as controls and were treated with 10–10–10 fertilizer without added iron salt. The two foot strips between the treated areas were left untreated.

Soybean seeds were planted in a row in the middle of each of the treated strips. After thirty days, the plants in the various rows were inspected with the results indicated in the table. The results show that chlorosis in soybeans is improved by suitable pretreatment of the "available iron" deficient soil in which the plants are grown.

SOYBEANS ON CHLOROSIS INDUCING LIMESTONE BASE SOIL

| Strip No. | Salt of Iron Cyanide | | | Fertilizer, lbs./acre | Chlorosis Observed after 30 days |
|---|---|---|---|---|---|
| | Salt | Fe Valence | lbs. Fe/acre | | |
| 1, 14, 25 |  |  | 0 | 500 | Severe. |
| 2, 19 | K | 2 | 2 | 500 | Severe to marked. |
| 3, 15 | K | 2 | 10 | 500 | Slight to moderate. |
| 4, 22 | K | 2 | 20 | 500 | None. |
| 5, 16 | K | 3 | 20 | 500 | Moderate. |
| 6, 13 | Na | 2 | 2 | 500 | Marked. |
| 7, 21 | Na | 2 | 10 | 500 | Moderate. |
| 8, 17 | Na | 2 | 20 | 500 | None. |
| 9, 23 | Ca | 2 | 10 | 500 | Moderate. |
| 10, 24 | Ca | 2 | 20 | 500 | None. |
| 11, 20 | Mg | 2 | 10 | 500 | Moderate. |
| 12, 18 | Mg | 2 | 20 | 500 | None. |

*Example VII*

During the course of the investigation of treatment of chlorotic plants, various chlorotic plants, trees, shrubs and grasses were treated with mixtures of salts of ferrocyanic and ferricyanic acid and 5–10–10 commercial fertilizer. The plant nutrient mixture was applied over an area approximating or slightly greater than the root area, i.e., the area presumably useful to the flower, plant, shrub, tree or grass being treated. For example, the treated area for trees growing in soil having a pH of 5.0, consisted of the area around the trunk extending so as far as the spread of the branches, this being considered to be substantially equivalent to the area covered by the root system. The plant nutrient mixture was broadcast over the total area of beds or plots of flowers and grasses.

All of the types of plants in the following table showed chlorotic symptoms which were completely or largely alleviated by treatment with the amount of iron salt (hexacyanoferrate) and fertilizer shown in the following table.

| Plant | Salt of Iron Cyanide | | | Fertilizer, lb./acre | Observation | |
|---|---|---|---|---|---|---|
| | Salt | Fe Valence | Amount, lb. Fe/acre | | Elapsed Time, weeks | Chlorosis |
| Avocado | NH4 | 2 | 25 | 750 | 6 | None. |
| St. Augustine Grass | Na / NH4 | 2 / 2 | 20 / 20 | 750 / 750 | 3 / 3 | None. / None. |
| Grapefruit | Na | 2 | 20 | 750 | 2 / 6 | Slight. / None. |
| Hydrangea | Na / Na | 2 / 3 | 30 / 30 | 750 / 750 | 4 / 4 | None. / Moderate. |
| Peach | K | 2 | 20 | 750 | 6 | Slight. |
| Azalea | Na | 2 | 25 | 750 | 4 | None. |
| Pear | Na | 2 | 20 | 750 | 6 | Slight. |
| Lupine Flowers | NH4 | 2 | 30 | 750 | 3 | None. |

*Example VIII*

A level approximately one hundred foot square plot which in the past has produced chlorotic soybean plants (pH 7.8) was plowed and harrowed, while being fertilized evenly with 200 lbs. of 5–10–10 commercial fertilizer i.e., at the rate of 872 lbs./acre. The middle 50′ x 100′ plot was treated evenly with 26 lbs. of calcium ferrocyanide powder i.e., at the rate of 40 lbs. Fe/acre. The two outer strips of 25′ x 100′ were not treated with the available iron salt.

Fifty rows of soybean seeds were planted across the treated area, so that the 25′ section at the end of each row was planted in soil not treated with calcium ferrocyanide powder and so that the 50′ mid section of each row was planted in the calcium ferrocyanide treated soil.

By inspection of the individual plants, it was observed that the seedlings and adult plants in the area treated with available iron were substantially non-chlorotic, while the seedlings and the adult plants in the area not treated with available iron were seriously to severely chlorotic. Cross inspection of the plot across the rows from outside the plot showed a remarkably sharp division between plants grown in the untreated and treated available iron portions of the plot.

*Example IX*

Three pin oaks, 5.7, 4.5 and 7.7 inches respectively in diameter at breast high (DBH), growing in soil of pH 7.6, 7.6 and 7.7 respectively were selected for treatment. The 5.7 DBH tree was in very poor condition, being severely defoliated and the remaining leaves being extremely chlorotic. The 4.5 DBH tree was not severely defoliated, but it was extremely chlorotic with brown necrotic areas on many of the leaves. The 7.7 DBH tree was chlorotic to a lesser extent than the other two trees.

Blends of ammonium ferrocyanide and 5–10–5 commercial fertilizer were applied to the soil around the trees in an area extending out as far as the spread of the branches. The results of treatment are shown in the following table.

| Pin Oak, DBH | Treated Area, Sq. Ft. | $(NH_4)_4Fe(CN)_6 \cdot 3H_2O$ | | Fertilizer | | Chlorosis Observations | |
|---|---|---|---|---|---|---|---|
| | | lbs. used | Rate, lbs. Fe/acre | lbs. used | lbs./ acre | 1 month | 1 year |
| 5.7 | 360 | 1 | 20 | 6.6 | 800 | Pronounced reduction | Vigorous tree; no chlorosis. |
| 4.5 | 190 | 0.5 | 20 | 3.5 | 800 | Marked improvement | Pronounced improvement. |
| 7.7 | 700 | 1.5 | 15 | 12.8 | 800 | Mild symptoms | Complete recovery. |

*Example X*

The following concentrate was prepared for hydroponic (soilless gardening) experiments with sunflower plants.

| | A | B | C |
|---|---|---|---|
| Potassium nitrate, $KNO_3$ lb | 40 | 40 | 40 |
| Calcium nitrate, $Ca(NO_3)_2 \cdot H_2O$ do | 7 | 7 | 7 |
| Treble phosphate, $Ca(H_2PO_4)_2 \cdot H_2O$ do | 10 | 10 | 10 |
| Magnesium sulfate, $MgSO_4 \cdot 7H_2O$ do | 10 | 10 | 10 |
| Sulfuric acid, $H_2SO_4$ do | 5.4 | 5.4 | 5.4 |
| Ferrous sulfate, $FeSO_4 \cdot 7H_2O$ do | 1.0 | | |
| Potassium ferrocyanide, $K_4Fe(CN)_6 \cdot 3H_2O$ do | | 1.5 | |
| Sodium ferrocyanide, $Na_4Fe(CN)_6 \cdot 10H_2O$ do | | | 1.7 |
| Manganese sulfate, $MnSO_4 \cdot 4H_2O$ oz | 2.5 | 2.5 | 2.5 |
| Borax, $Na_2B_4O_7 \cdot 10H_2O$ do | 2.0 | 2.0 | 2.0 |
| Zinc sulfate, $ZnSO_4 \cdot H_2O$ do | 1 | 1 | 1 |
| Copper sulfate, $CuSO_4 \cdot 5H_2O$ do | 2/3 | 2/3 | 2/3 |

The concentrate which contains $N-P_2O_5-K_2O$ in the ratio of 6–5–20 was prepared as follows: The treble superphosphate and Epsom salts in powdered form were mixed in a wooden box and the sulfuric acid slowly added and stirred. The rest of the chemicals were pulverized and added and the whole mass mixed thoroughly together. The three concentrates were the same except for using ferrous sulfate in formulation A, potassium ferrocyanide in formulation B and sodium ferrocyanide in formulation C. The amounts of iron compounds used yielded formulations containing equivalent amounts of iron.

One pound of each of the concentrates were added to 125 gallons of water to yield solutions A, B and C, which were adjusted to pH7.

The solutions, containing equivalent amounts of iron, were added to three similar 3′ x 10′ tanks thereby filling them to a depth of about 6⅔ inches. Sunflowers were grown from seeds of chlorotic sunflowers, using standard hydroponic techniques.

Sunflower plants grown in contact with solution A were observed to be moderately to severely chlorotic.

Sunflower plants grown in contact with solutions B and C were observed to be healthy and vigorous plants without chlorotic symptoms.

*Example XI*

The concentrates of Example X were used to prepare additional quantities of the solutions as needed. Solution A (containing ferrous sulfate) and solution B (containing potassium ferrocyanide) were used weekly to supply plant nutrients to mature chlorotic grape vines, shrubs and potted plants at a rate calculated roughly to be in the range of 10–20 lbs. Fe/acre.

Chlorotic symptoms were markedly reduced or entirely absent after two to four treatments of grape vines, roses, azaleas, rhododendron, hydrangeas and lupines with solution B, after which the treatment was stopped. The chlorotic symptoms had not recurred after six months. Similar results were obtained by treatment of chlorotic plants with solution C of Example X.

No noticeable change was noted in the shrubs, vines and plants treated with solution A for four weeks. After the fourth treatment, the use of solution A was discontinued and the plants were watered but not fertilized for an additional four weeks, without any noticeable decrease in chlorosis of the leaves. The plants were then treated with solution B and the chlorosis was noted to have markedly decreased or entirely disappeared after two to four weekly treatments.

Various other modifications and variations will be obvious to a person skilled in the art and it is to be understood that such modifications and variations are to be included in the purview of the application and the spirit and scope of the appended claims. Such modifications and variations include the employment of the hexacyanoferrates in agricultural and floricultural pesticidal compositions, e.g., germicides, fungicides, nematocides, insecticides, herbicides and the like as well as with growth stimulants (plant hormones), leaf glossing agents, soil alkalizing such as lime and the like, in the form of dusts (e.g. with sulfur), aqueous solutions (hydroponics), emulsions, suspensions, etc.

I claim:
1. The method of controlling iron chlorosis in growing plants in calcareous soils having a pH range of 7.5 to 8.5 which comprises spraying said soil with an aqueous solution containing an antichlorotic amount of a salt selected from the group consisting of water soluble salts of ferrocyanic and ferricyanic acids, said amount being from 5 to 800 pounds per acre.

2. A process of eradicating iron deficiency in calcareous soils having a pH range of 7.5 to 8.5 and minimizing said deficiency in chlorophyllaceous plants comprising introducing to the soil surface in the vicinity of said plants a water soluble salt selected from the group consisting of salts of ferrocyanic and ferricyanic acids in an amount of from 5 to 800 pounds per acre.

3. The process according to claim 1 wherein the water soluble salt is an alkali metal salt of ferrocyanic acid.

4. The process according to claim 2 wherein the water soluble salt is an alkali earth metal salt of ferricyanic acid.

5. A process of treating calcareous soil having a pH range of 7.5 to 8.5 in which chlorophyllaceous plant material are grown and which are susceptible to chlorosis which comprises applying to said soil potassium ferrocyanide in an amount of from 5 to 800 pounds per acre.

6. The method of controlling iron chlorosis on growing plants in calcareous soils having a pH range of 7.5 to 8.5 which comprises spraying said soil with an aqueous solution containing potassium ferrocyanide in an amount of from 5 to 800 pounds per acre.

References Cited in the file of this patent

UNITED STATES PATENTS

| | | |
|---|---|---|
| 824,791 | Jenkner et al. | July 3, 1906 |
| 1,227,454 | Kleckner | May 22, 1917 |
| 2,534,787 | Mecca | Dec. 19, 1950 |

OTHER REFERENCES

Soil Science, Deuber, C. G., 21 (1926), No. 1, pp. 23–26.

Circular 85, Utah, Agricultural Experimenting Station, Chlorosis, Yellowing of Plants, F. B. Wann, May 1930, pages 1–12.